United States Patent
Williams

(10) Patent No.: US 9,215,173 B1
(45) Date of Patent: Dec. 15, 2015

(54) FIBER NODE DISCOVERY USING RANGING DELAY DATA

(75) Inventor: Thomas Williams, Longmont, CO (US)

(73) Assignee: ARRIS Enterprises, Inc., Suwanee, GA (US)

( * ) Notice: Subject to any disclaimer, the term of this patent is extended or adjusted under 35 U.S.C. 154(b) by 344 days.

(21) Appl. No.: 13/077,583

(22) Filed: Mar. 31, 2011

Related U.S. Application Data

(60) Provisional application No. 61/319,412, filed on Mar. 31, 2010.

(51) Int. Cl.
*H04L 12/801* (2013.01)
*H04N 21/61* (2011.01)
*H04J 3/06* (2006.01)
*G06F 11/07* (2006.01)

(52) U.S. Cl.
CPC ............ *H04L 47/10* (2013.01); *G06F 11/0748* (2013.01); *H04J 3/0682* (2013.01); *H04N 21/6118* (2013.01)

(58) Field of Classification Search
CPC ......... H04J 1/12; H04J 3/0682; H04J 14/025; H04J 14/0232; H04L 12/2801; H04N 1/2034; H04N 1/32609; H04N 1/32625; H04N 1/32683; H04N 1/32795; H04N 7/22; H04N 7/17309; H04N 7/17318; H04N 17/00; H04N 21/6118; H04N 21/44245; H04N 2007/17372; G06F 11/0748
USPC ............ 370/241, 248, 249, 250, 252; 398/43, 398/45, 52, 53
See application file for complete search history.

(56) References Cited

U.S. PATENT DOCUMENTS

| | | | | |
|---|---|---|---|---|
| 5,990,687 | A * | 11/1999 | Williams ...................... | 324/529 |
| 6,490,727 | B1 * | 12/2002 | Nazarathy et al. ............ | 725/129 |
| 6,530,066 | B1 * | 3/2003 | Ito et al. ........................ | 716/113 |
| 6,707,829 | B1 * | 3/2004 | Hanks et al. .................. | 370/519 |
| 6,791,995 | B1 * | 9/2004 | Azenkot et al. ............... | 370/436 |
| 6,956,865 | B1 * | 10/2005 | Khaunte et al. ............... | 370/442 |
| 2005/0254417 | A1 * | 11/2005 | Walston ........................ | 370/216 |
| 2008/0320541 | A1 * | 12/2008 | Zinevich ...................... | 725/127 |

* cited by examiner

*Primary Examiner* — Alpus H Hsu
*Assistant Examiner* — Dharmesh Patel
(74) *Attorney, Agent, or Firm* — Bart A. Perkins

(57) ABSTRACT

Systems and methods can provide for fiber node discovery using ranging delay data for broadband communication infrastructure. In some implementations, such systems and methods can provide for determining and storing fiber node ranging delay windows. In other implementations, such systems and methods can also provide for using ranging delay data from CPE devices to ascertain the associated fiber node. Improved diagnosis and discovery of fiber node associated CPE devices can, for example, help operators plan maintenance and thereby reduce truck rolls.

20 Claims, 5 Drawing Sheets

FIBER NODE DISCOVERY USING RANGING DELAY DATA

RELATED APPLICATIONS

This application is a non-provisional application claiming the benefit of U.S. Provisional Application Ser. No. 61/319,412, entitled "Fiber Node Discovery Using Ranging Delay Data," filed Mar. 31, 2010, which is hereby incorporated by reference in its entirety.

TECHNICAL FIELD

This disclosure relates to discovery using ranging delay data.

BACKGROUND

Efficient problem diagnosis for network infrastructure has grown in importance as network services have become more ubiquitous. Such network services can include cable service. Currently, the most popular cable architecture is a hybrid fiber coax (HFC) architecture. An HFC architecture can employ fiber optic cable for the long distance from a hub (or headend) site to a node. A hub site (or headend) is a source point for downstream signals and a destination point for upstream signals. A fiber node can include a grouping of approximately 500 homes passed. Inside a node the signals are distributed via coaxial cable to customer premise equipment (CPE) devices, which are typically located inside a home, apartment, or office. A CPE device can be a cable modem (CM), multimedia terminal adapter (MTA), set-top box (STB), or gateway device. A coaxial portion of the cable plant is built with a tree-and-branch architecture, so an outage on a fiber node branch can potentially affect multiple subscribers in different geographic locations.

Diagnosis of a network problem can be performed using software that communicates with the CPE devices. Cable service assurance involves the identification and subsequent troubleshooting of problems in an HFC network. A problem can originate from a CPE device, a fiber node, or a cable modem termination system (CMTS). A fiber node can connect the CMTS to CPE devices. An important diagnosis is identifying the particular fiber node that is associated with a CPE device experiencing an outage. Several inputs to and outputs from multiple fiber nodes can be summed together to provide connectivity to a single CMTS at a hub site. As a consequence, there is no obvious and reliable method to identify the connectivity of a fiber node with a CPE device. Typically, the billing data of a CPE device can be used to identify the fiber node information. However, the billing data can often become out-of-date and costly to update regularly.

BRIEF DESCRIPTION OF THE DRAWINGS

Like reference numbers and designations in the various drawings indicate like elements.

DETAILED DESCRIPTION

In some implementations of this disclosure, systems and methods can operate to use ranging delay data to identify which fiber node can be associated with a CPE device. In some implementations, non-overlapping fiber node ranging delay windows can be established by identifying and combining fiber nodes with overlapping ranging delays. For example, fiber nodes with overlapping ranging delays can be combined by re-wiring and combining to make a composite input or output fiber node signal.

Moreover, upon combining the fiber nodes, the resulting information can be stored and accessible by an operator and/or computer program. The fiber node delay window values can be stored in devices such as, for example, a database in a computing device. In other implementations, the fiber node delay window values can be stored in other network device such as, for example, a CMTS or CPE device. In still further implementations, the fiber node delay window values can be stored and retrieved by field operators in a portable electronic device such as, for example, a personal data assistant (PDA) or cellular phone.

In some implementations, the management information base (MIB) counters of a CPE device can be used to identify the fiber node association based upon ranging delay data. Ranging data delay data can be accessed using MIB counters located in the CPE device. The obtained MIB ranging delay data can be compared and matched with fiber node ranging delay windows to ascertain the fiber node associated with the CPE device. Ranging delay windows can be associated with distinct fiber nodes. Because only one fiber node or a group is associated within a specific range, the fiber node and ranging delay window can be uniquely associated.

In some implementations, the fiber node ranging delay windows can be accessed in networked devices such as, for example, a computer or other networked device. In other further implementations, the fiber node delay window values can be stored and retrieved by field operators in a portable electronic device such as, for example, a personal digital assistant (PDA) or cellular phone. In still further implementations, the comparison can be accomplished automatically by automated computing systems.

Figure 1:
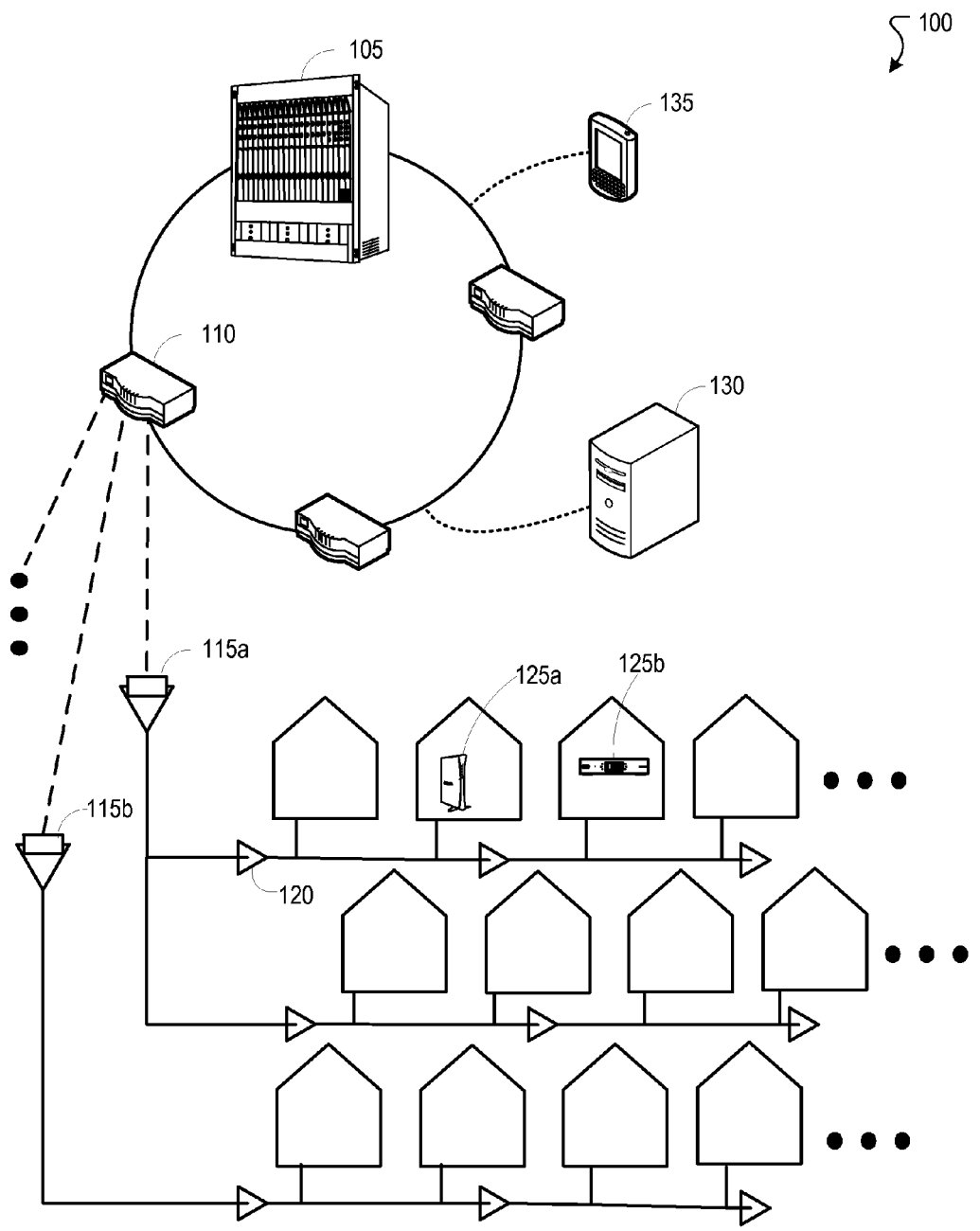
FIG. 1 is a block diagram illustrating an example HFC architecture operable to provide fiber node discovery using ranging delay data.

FIG. 1 is a block diagram illustrating an example HFC architecture operable to provide fiber node discovery using ranging delay data. The architecture 100 can include a CMTS 105 connected to one or more distribution hub(s) 110. The distribution hub(s) can be connected to one or more optical node(s) 115*a-b*. The optical nodes can expand services to many geographically dispersed users with trunk radio-frequency (RF) amplifiers 120. The amplifiers provide data to the end user at their home, apartment, and/or office. CPE devices 125*a-b* can reside inside the home at can include a variety of different types of devices, including, for example, cable modems (CMs) 125*a*, multimedia terminal adapters (MTAs), set-top boxes (STBs) 125*b*, or gateway devices.

The CPE devices 125*a-b* can communicate with a computing device 130 or other broadband communication device that is operable to implement fiber node discovery using ranging delay data. In some implementations, the computing device can be a server or other network device with programming capability such as, for example, a programmable router, switch, server or personal digital assistant (PDA) 135. The computing device 130 can be connected to the CPE devices over a network using existing network infrastructure such as, for example, the internet. In some implementations, the communication can occur over other networks such as, for example, an 802.11-type connection, ATM, or other types of networks, and combinations thereof.

Figure 2:
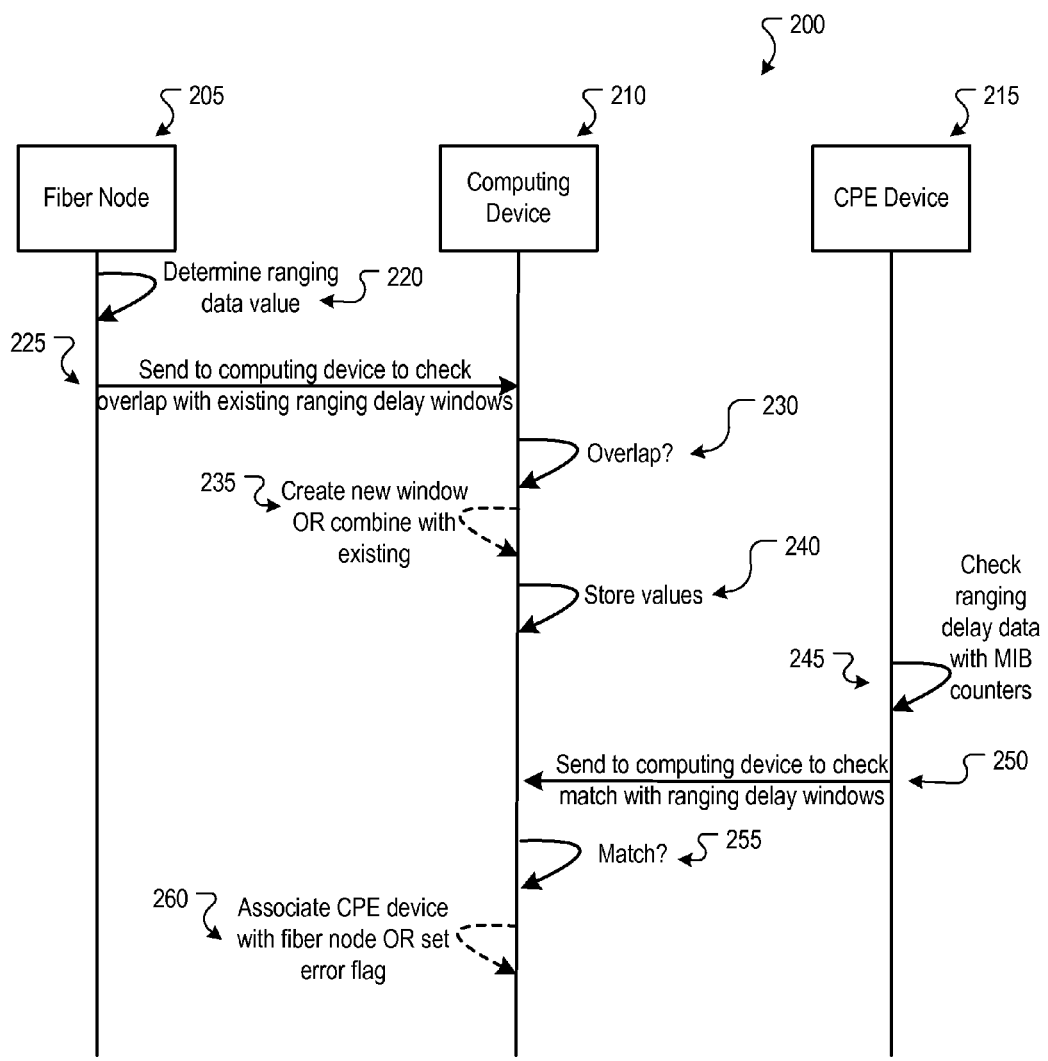
FIG. 2 is a sequence diagram illustrating an example initialization flow operable to provide fiber node discovery using ranging delay data.

FIG. 2 is a sequence diagram illustrating an example initialization flow operable to provide fiber node discovery using ranging delay data. The initialization flow for the node discovery using ranging delay data from a fiber node 205 to a computing device 210, and eventually to a CPE device 215 can begin with a determination of a fiber node ranging delay data (220). Fiber node ranging delay data can be used to combine overlapping fiber nodes to create distinct fiber node ranging windows. In various examples, the fiber node ranging delay data can be retrieved by a computing device 210 or a manual operator.

Upon identification of the fiber node ranging delay data, the fiber node can then proceed to transmit fiber node ranging delay data to the computing device 210 (225). In some implementations, an operator can input fiber node ranging delay data directly into the computing device 210 and no transmission occurs. In other implementations, a second computing device or handheld device can transmit the fiber node ranging delay data over a network to the computing device 210.

Upon receiving the fiber node ranging delay data, the computing device 210 can determine if the value overlaps with current fiber node ranging delay windows (230). If there is no overlap, then the computing device 210 can create a new fiber node ranging delay window entry (235). If there is overlap, then the computing device 210 can combine the fiber node with the existing overlapping fiber node ranging delay window (235). In some implementations, the overlap can be determined by an operator.

The computing device 210 can then store the values in a memory unit such as, for example, a database for retrieval (240). In some implementations, fiber node discovery of a CPE device 215 can begin with obtaining the CPE ranging delay data from the MIB counters (245). In other implementations, the CPE ranging delay data can be stored in another storage unit inside the CPE device 215. Upon identification of the CPE ranging delay data, the CPE device 215 can then proceed to transmit the ranging delay data to the computing device 210 (250). In some implementations, the computing device 210 can request the ranging delay data from the CPE device 215.

Upon receiving the CPE ranging delay data, the computing device 210 can attempt to match the CPE ranging delay data with an existing fiber node ranging delay window to ascertain the fiber node that the CPE device 215 can be associated with (255). If there is no match, then an error flag can be set and an operator can be alerted (260). If there is a match, then the CPE device 215 can properly be associated with the matched fiber node (260). In some implementations, an error flag need not be set in response to a no match.

Figure 3:
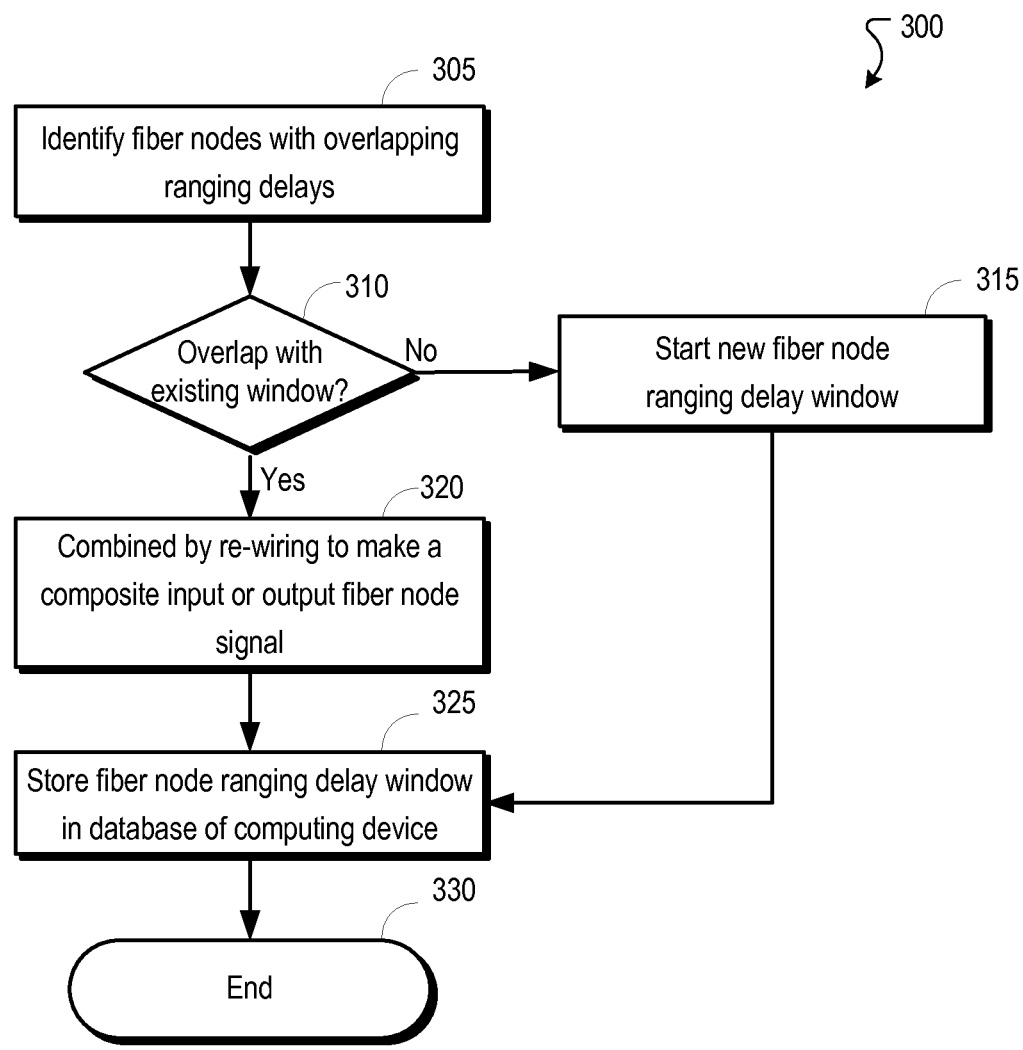
FIG. 3 is a flowchart illustrating an example process operable to provide fiber node ranging delay windows.

FIG. 3 is a flowchart illustrating an example process operable to provide fiber node ranging delay windows. The process 300 can begin at stage 305 when a computing device retrieves and/or receives input of ranging delay data for a fiber node. The computing device (e.g., computing device 130 of FIG. 1) can retrieve the ranging delay data using an operator measurement of the fiber node (e.g., fiber node 115*a-b* of FIG. 1). In some implementations, ranging delay data can be obtained from another networked device. In still further implementations, ranging delay data can be measured by a program operating on the computing device.

At stage 310, a determination can be made whether the ranging delay overlaps with an existing fiber node ranging delay window. The determination can be made, for example, by measuring the delay for fiber nodes (e.g., fiber node 115*a-b* of FIG. 1). In some implementations, the comparison and assignment to an overlapping fiber node ranging delay window can be performed manually by an operator. In other implementations, the comparison can be performed by a computer program.

If the ranging delay does not overlap at stage 310, then at stage 315, the existing fiber node can be used to start a new fiber node ranging delay window entry. The fiber node (e.g., fiber node 115*a-b* of FIG. 1) can be assigned to a new fiber node ranging delay window by a computing device (e.g., computing device 130 of FIG. 1). In some implementations, a new fiber node ranging delay window assignment can be accomplished manually by an operator. In other implementations, a new fiber node window entry can be accomplished by the operator and computing device. The process 300 proceeds to stage 325.

If the ranging delay does overlap at stage 310, then at stage 320, the fiber node can be combined with the overlapping fiber node by re-wiring and making a composite input or output fiber node signal. The fiber node (e.g., fiber node 115*a-b* of FIG. 1) can be assigned to an existing fiber node ranging delay window by a computing device (e.g., computing device 130 of FIG. 1). In some implementations, combining a fiber node into a fiber node ranging delay window can be accomplished manually by an operator. In other implementations, combining a fiber node window entry can be accomplished by the operator and computing device.

At stage 325, the fiber node ranging delay window can be updated and stored in a database of a computing device. The update and storage can be performed by and occur in a computing device (e.g., computing device 130 of FIG. 1). In some implementations, the update and storage can be performed by an operator and occur in a computing device. In other implementations, the update can occur and the fiber node ranging delay window values can be sent to operators. The process 300 ends at stage 330.

Figure 4:
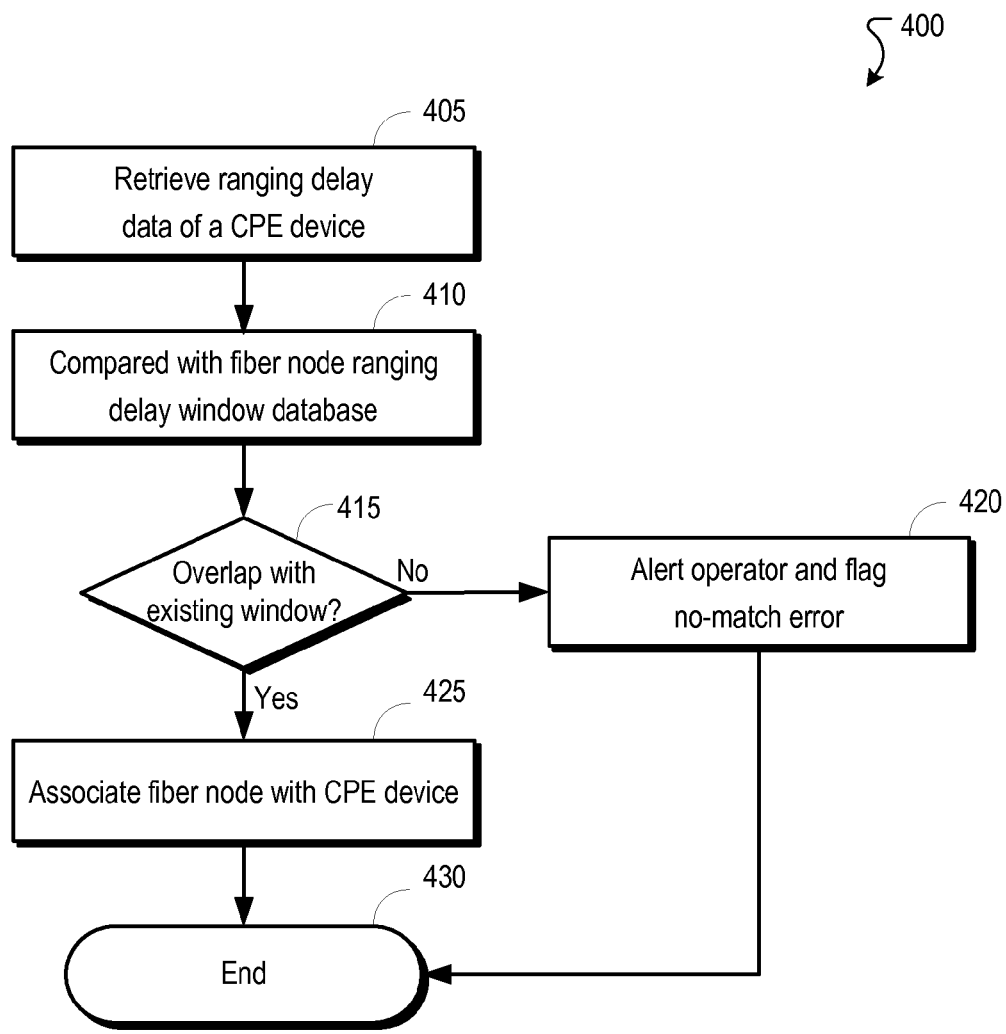
FIG. 4 is a flowchart illustrating an example process operable to provide fiber node discovery using ranging delay data.

FIG. 4 is a flowchart illustrating an example process operable to provide fiber node discovery using ranging delay data. The process 400 can begin at stage 405 when a computing device retrieves ranging delay data for a CPE device. The computing device (e.g., computing device 130 of FIG. 1) can retrieve the ranging delay data of the CPE device (e.g., CPE device 125*a-b* of FIG. 1) using MIB counters. In some implementations, the retrieval of the ranging delay data can be performed manually by an operator. In other implementations, the retrieval of the ranging delay data can occur from another mechanism and/or storage area instead of the MIB counters. In still further implementations, ranging delay data can be measured by a program operating on the computing device or another networked device over the network.

At stage 410, the CPE ranging delay data can be compared to fiber node ranging delay windows. The comparison can be made by a computing device (e.g., computing device 130 of FIG. 1). In some implementations, the comparison can be performed manually by an operator. In other implementations, the comparison can be performed by a separate networked device and subsequently transmitted to the operator.

At stage 415, a determination can be made whether a match has occurred with the CPE ranging delay data and an existing fiber node ranging delay window. The determination can be made, for example, by using a computing device (e.g., computing device 130 of FIG. 1) to compare the obtained CPE (e.g., CPE device 125*a-b* of FIG. 1) ranging delay window with the fiber node ranging delay windows. In some implementations, the determination can be made manually by an operator. In other implementations, the determination can be made in a separate networked device and subsequently transmitted to the operator.

If a match does not occur at stage 415, then at stage 420, the operator can be alerted and a no-match error flag can be set. The no-match error flag and operator alert can be performed by a computing device (e.g., computing device 140 of FIG. 1). In some implementations, an error flag need not be set. In other implementations, a new fiber node ranging delay window can be established. In still further implementations, the computing device can record a no-match and take no further action. The process 400 ends at stage 430.

If a match does occur at stage 415, then at stage 425, the matching fiber node can be associated with the CPE device and the operator can be alerted. The association and operator alert can be performed by a computing device (e.g., computing device 140 of FIG. 1). In some implementations, the association can be stored for retrieval at another time. In other implementations, the association transmitted across the network. In still further implementations, the association reported to the operator and not stored. The process 400 ends at stage 430.

Figure 5:
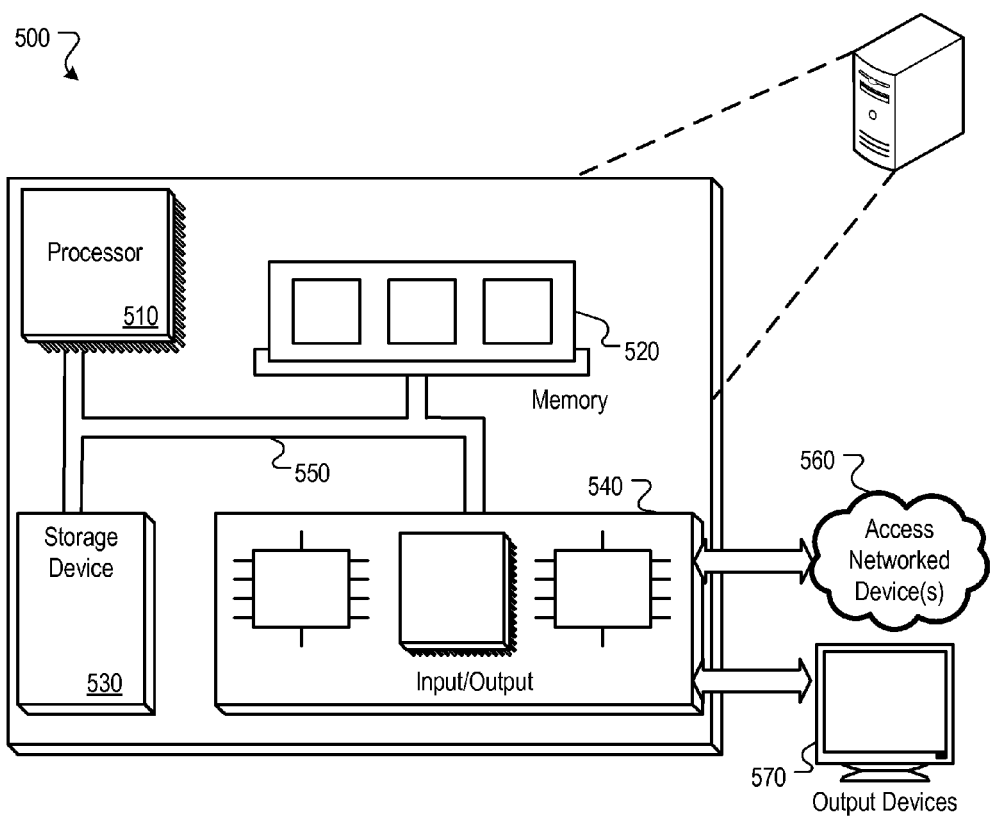
FIG. 5 is a block diagram of a computing device operable to provide fiber node discovery using ranging delay data.

FIG. 5 is a block diagram of a computing device operable to provide fiber node discovery using ranging delay data. In some implementations, the computing device 500 (e.g., computing device 130 of FIG. 1) can execute a portion or all of the cluster outage detection. In other implementations, the computing device can execute a portion of all of the time-stamped outage data and visualization. It should be understood that many different kinds of network devices (e.g., including network hubs, bridges, routers, edge termination devices, etc.) can implement cluster outage detection and/or time-stamped outage data and visualization.

The device (e.g., computing device 130 of FIG. 1) 500 can include a processor 510, a memory 520, a storage device 530, and an input/output device 540. Each of the components 510, 520, 530, and 540 can, for example, be interconnected using a system bus 550. The processor 510 is capable of processing instructions for execution within the device 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the device 500. In one implementation, the memory 520 is a computer-readable medium. In some implementation, the memory 520 is a volatile memory unit. In another implementation, the memory 520 is a non-volatile memory unit.

In some implementations, the storage device 530 is capable of providing mass storage for the device 500. In one implementation, the storage device 530 is a computer-readable medium. In various different implementations, the storage device 530 can, for example, include a hard disk device, an optical disk device, flash memory or some other large capacity storage device.

The input/output device 540 provides input/output operations for the device 500. In one implementation, the input/output device 540 can include one or more of a plain old telephone interface (e.g., an RJ11 connector), a network interface device, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, such as one or more CPE devices (e.g., set top box, cable modem, etc.) or other CPE device via a network 560. In another implementation, the input/output device can include driver devices configured to receive input data and send output data to other input/output devices (e.g., a computer display 570).

The computing device of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, e.g., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "system processor" encompasses all apparatus, devices, and machines for processing data, including by way of example a programmable processor, a computer, or multiple processors or computers. The system processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The elements of a computer typically include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a telephone, a cable modem, a set-top box, a mobile audio or video player, or a game console, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be operable to interface with a computing device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

What is claimed is:

1. A computer-implemented method, comprising:
    identifying a plurality of fiber node ranging delays, wherein each respective one of the plurality of fiber node ranging delays is associated with a respective one of a plurality of broadband devices, and each respective one of the plurality of fiber node ranging delays is based on information received from the respective one broadband device associated with the respective one fiber node ranging delay via a processing device;
    establishing a plurality of groups of non-overlapping fiber node ranging delays, wherein each respective one of the plurality of groups is associated with a fiber node and comprises one or more of the identified fiber node ranging delays, the groups being established by wiring the fiber nodes such that each fiber node is associated with a unique range of fiber node ranging delays and none of the fiber nodes include overlapping ranging delays with another fiber node, whereby the established groups allow an assurance system to differentiate between fiber nodes based upon ranging delay;
    determining one or more fiber node ranging delay windows based on the established groups using the processing device, wherein each respective one of the one or more fiber node ranging delay windows comprises a range of fiber node ranging delays identified from one or more subscriber devices associated with one or more fiber nodes, the range comprising the unique ranges of each of the one or more fiber nodes;
    storing one or more fiber node ranging delay windows in a datastore associated with the processing device; and
    determining that a fiber node is faulty at the processing device, the determination being based on the presence of a plurality of impaired broadband devices having fiber node ranging delays within the ranging delay window associated with the fiber node that is determined to be faulty.

2. The computer-implemented method of claim 1, wherein the datastore comprises a computer hard drive.

3. The computer-implemented method of claim 1, wherein the datastore comprises a database.

4. The computer-implemented method of claim 1, wherein the datastore comprises a personal data assistant.

5. The computer-implemented method of claim 1, wherein the datastore comprises a cellular telephone.

6. The computer-implemented method of claim 1, wherein the datastore comprises a handheld electronic device.

7. The computer-implemented method of claim 1, wherein the fiber node ranging delay is retrieved using a field operator.

8. The computer-implemented method of claim 1, further comprising identifying fiber node ranging delay windows based upon identification of non-overlapping fiber node ranging delay windows.

9. The computer implemented method of claim 8, wherein identification of nonoverlapping fiber node ranging delay windows is based upon identifying and combining fiber nodes with overlapping ranging delays.

10. The computer implemented method of claim 9, wherein fiber nodes with overlapping ranging delays can be combined by re-wiring and combining to form a composite input or output fiber node signal.

11. A computer-implemented method, comprising:
retrieving a fiber node ranging delay from a broadband device using a processing device;
comparing the fiber node ranging delay retrieved from the broadband device with one or more fiber node ranging delay windows using the processing device, wherein each respective one of the one or more fiber node ranging delay windows comprises a range of fiber node ranging delays identified from one or more subscriber devices associated with a fiber node, and wherein the range of fiber node ranging delays associated with the fiber node does not overlap with the range of fiber node ranging delays associated with any other fiber node;
determining that the retrieved fiber node ranging delay falls within the range of a fiber node ranging delay window associated with a fiber node;
associating the broadband device with the fiber node based on the determination that the retrieved fiber node ranging delay falls within the range of the fiber node ranging delay window associated with the fiber node, whereby the fiber node ranging delay window allows an assurance system to differentiate between fiber nodes based upon ranging delay and identify the extent of an outage or service impairment; and
determining that a fiber node is faulty at the processing device, the determination being based on the presence of a plurality of impaired broadband devices having fiber node ranging delays within the fiber node ranging delay window associated with the fiber node that is determined to be faulty.

12. The method of claim 11, wherein the fiber node ranging delay is retrieved by accessing a broadband device management information base (MIB).

13. The method of claim 12, wherein the fiber node ranging delay is retrieved using a field operator.

14. The method of claim 11, wherein the fiber node ranging delay is compared with one or more fiber node ranging delay windows by an automated computer process.

15. The computer-implemented method of claim 11, further comprising:
generating an alert if the fiber node ranging delay retrieved from the broadband device does not match at least one of the one or more fiber node ranging delay windows.

16. A computer-implemented method, comprising:
determining a range of fiber node ranging delays associated with each of one or more fiber nodes, wherein each respective one of the fiber node ranging delays is associated with a respective one of a plurality of broadband devices, and each respective one of the fiber node ranging delays is based on information received from the respective one broadband device associated with the respective one fiber node ranging delay via a processing device;
establishing a plurality of groups of non-overlapping fiber node ranging delays, wherein each respective one of the plurality of groups is associated with a fiber node and comprises one or more of the identified fiber node ranging delays, the groups being established by wiring the fiber nodes such that each fiber node is associated with a unique range of fiber node ranging delays and none of the fiber nodes include overlapping ranging delays with another fiber node, whereby the established groups allow an assurance system to differentiate between fiber nodes based upon ranging delay;
associating one or more of the fiber nodes with a new fiber node ranging delay window if the range of fiber node ranging delays associated with the one or more fiber nodes does not overlap the range of fiber node ranging delays associated with an existing fiber node ranging delay window, or associating one or more of the fiber nodes with an existing fiber node ranging delay window if the range of fiber node ranging delays associated with the one or more fiber nodes overlaps the range of fiber node ranging delays associated with the existing fiber node ranging delay window;
retrieving ranging delay data associated with a customer premise equipment device;
comparing ranging delay data associated with the customer premise equipment device with the fiber node ranging delays associated with the fiber node ranging delay windows; and
associating the customer premise equipment device with a fiber node ranging delay window if the ranging delay data associated with the customer premise equipment device falls within the fiber node ranging delay window.

17. The computer-implemented method of claim 16, further comprising:
generating an alert if the ranging delay data associated with the customer premise equipment device falls within a fiber node ranging delay window, wherein the alert is operable to communicate the association between the customer premise equipment device and fiber node ranging delay window.

18. The computer-implemented method of claim 16, further comprising:
generating an alert if the ranging delay data associated with the customer premise equipment device does not fall within a fiber node ranging delay window.

19. The computer-implemented method of claim 16, further comprising:
determining whether a fiber node is faulty based on the association of one or more impaired customer premise equipment devices with the same fiber node ranging delay window.

20. The computer-implemented method of claim 16, further comprising:
storing the association between the customer premise equipment device and fiber node ranging delay window for later retrieval.

* * * * *